UNITED STATES PATENT OFFICE.

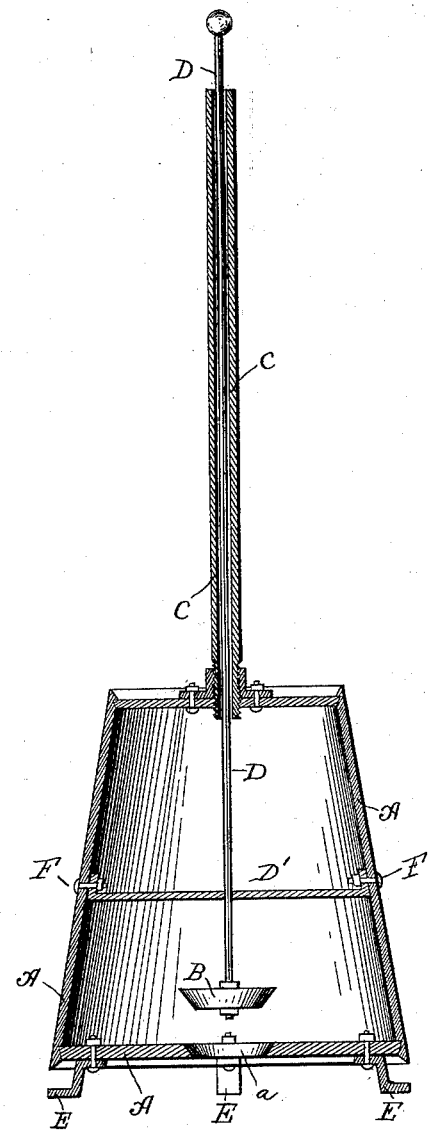

EDGAR C. DAVIS, OF EARLVILLE, ILLINOIS.

CISTERN-CLEANING DEVICE.

SPECIFICATION forming part of Letters Patent No. 485,092, dated October 25, 1892.

Application filed May 27, 1892. Serial No. 434,631. (No model.)

*To all whom it may concern:*

Be it known that I, EDGAR C. DAVIS, a citizen of the United States, residing at Earlville, in the county of La Salle and State of Illinois, have invented certain new and useful Improvements in Cistern-Cleaning Devices; and I do hereby declare the following to be a full, clear, and exact description of the invention, such as will enable others skilled in the art to which it appertains to make and use the same.

My invention has relation to improvements in devices for cleaning cisterns and the like; and it consists in the peculiar construction, certain novel combinations, and the adaptation of parts hereinafter described, and particularly pointed out in the claim appended.

In the accompanying drawing the figure is a vertical diametrical section of my improved device.

Referring by letter to the said drawing, A indicates the casing of my improved device, which is preferably of a general cylindrical form, as illustrated, and is provided in its bottom with an aperture $a$ for the admission of sediment, filth, &c. This opening $a$ has its side walls beveled, as shown, to form a seat for the vertically-movable valve B, which is preferably of a dovetail form in diametrical section, as shown.

Suitably connected to the top of the casing A and extending into the said casing is a tubular handle C, through the medium of which the device is adjusted to position. Taking freely through this tubular handle C is a rod D, through the medium of which the valve is manipulated.

The letter D' indicates a cross-bar extending diametrically across the interior of the casing A and provided with angular ends, which are secured to the said casing by means of bolts F. The rod D passes through a central opening in said cross-bar D', which serves as a guide to said rod, so as to accurately center the valve to the seat and guide it thereto during the act of closing. By this manner of manipulating the valve B it will be seen that the same may be turned readily when desired to free it from the dirt and filth which has collected upon it.

Suitably connected to the lower end of the side wall of the casing A are detachably-flanged feet, as E, which serve to hold the same above the bottom of the cistern, so as to allow a free entrance of the sediment, filth, &c., into the casing.

In operation the upper end of the tubular handle C is held in hand and the casing is pushed to the bottom of the cistern, the valve B being closed until the device is seated in position, when the valve is opened. The force of the water entering the casing through the opening $a$ serves as a suction, which draws the sediment into the casing. When the casing is filled with sediment, it is removed, after which the valve B is opened through the medium of the rod D to discharge the same.

From the foregoing description, taken in conjunction with the accompanying drawing, it will be readily perceived that I have provided a device through the medium of which a cistern may be readily cleaned without removing the water therefrom and without contaminating the same.

Having thus described my invention, what I claim, and desire to secure by Letters Patent, is—

In a cistern-cleaning device, the combination, with the casing A, having flanged detachable feet and a valve-opening $a$, of the tubular handle C, cross-bar D', the valve-rod D, and valve B, the valve-rod extending through the handle and through a central aperture in the cross-bar, which serves as a guide to center the valve to its seat, substantially as specified.

In testimony whereof I affix my signature in presence of two witnesses.

EDGAR C. DAVIS.

Witnesses:
 CHAS. HOSS,
 RALPH I. DODGE.